United States Patent
Massal

(10) Patent No.: US 10,160,539 B2
(45) Date of Patent: Dec. 25, 2018

(54) LAMINATED BALL JOINT CONNECTION DEVICE BETWEEN A ROTORCRAFT ROTOR BLADE AND A LEAD/LAG DAMPER OF SAID BLADE

(71) Applicant: AIRBUS HELICOPTERS, Marignane (FR)

(72) Inventor: Fabien Massal, Saint Chamas (FR)

(73) Assignee: AIRBUS HELICOPTERS, Marignane (FR)

( * ) Notice: Subject to any disclaimer, the term of this patent is extended or adjusted under 35 U.S.C. 154(b) by 364 days.

(21) Appl. No.: 14/962,172

(22) Filed: Dec. 8, 2015

(65) Prior Publication Data
US 2016/0167779 A1 Jun. 16, 2016

(30) Foreign Application Priority Data
Dec. 11, 2014 (FR) .................................. 14 02816

(51) Int. Cl.
*B64C 27/39* (2006.01)
*B64C 27/51* (2006.01)

(52) U.S. Cl.
CPC .............. *B64C 27/39* (2013.01); *B64C 27/51* (2013.01)

(58) Field of Classification Search
CPC ......... B64C 27/39; B64C 27/51; B64C 27/54; F16C 11/0604; F16C 11/106; F16C 11/045
See application file for complete search history.

(56) References Cited

U.S. PATENT DOCUMENTS

| | | | |
|---|---|---|---|
| 4,915,585 A | 4/1990 | Guimbal | |
| 5,141,398 A | 8/1992 | Bietenhader et al. | |
| 5,636,970 A | 6/1997 | Certain | |
| 5,902,050 A | 5/1999 | Balczun et al. | |
| 8,622,703 B2 * | 1/2014 | Girard | B64C 27/35 416/134 A |
| 9,731,819 B2 * | 8/2017 | Wiinikka | B64C 27/51 |
| 2004/0001754 A1 | 1/2004 | Levallard et al. | |
| 2004/0037701 A1 | 2/2004 | Pancotti | |

(Continued)

FOREIGN PATENT DOCUMENTS

| | | |
|---|---|---|
| EP | 2803571 | 11/2014 |
| FR | 2630703 | 11/1989 |
| FR | 2653405 | 4/1991 |

(Continued)

OTHER PUBLICATIONS

French Search Report for French Application No. FR 1402816, Completed by the French Patent Office on Jul. 30, 2015, 7 Pages.

*Primary Examiner* — Logan M Kraft
*Assistant Examiner* — John S Hunter, Jr.
(74) *Attorney, Agent, or Firm* — Brooks Kushman P.C.

(57) ABSTRACT

A rotorcraft rotor having each of its blades fitted with a lead/lag damper. A connection device between the blade root of a blade under consideration and a lead/lag damper comprises a rod passing through a laminated ball joint secured to a distal endpiece of the lead/lag damper. The rod extends in the general plane in which the blade extends, being prevented from moving firstly in rotation by being embedded in the blade root and secondly in translation along the general transversely-extending direction of the blade by being pinned to a U-shaped yoke fastened to the blade root.

20 Claims, 2 Drawing Sheets

(56) References Cited

U.S. PATENT DOCUMENTS

2014/0178199 A1* 6/2014 Wiinikka ................ B64C 27/51
                                                                                                 416/1

FOREIGN PATENT DOCUMENTS

| FR | 2733961 | 11/1996 |
| FR | 2839945 | 11/2003 |
| FR | 3005631 | 11/2014 |
| GB | 2041310 | 9/1980 |
| WO | 9745650 | 12/1997 |

* cited by examiner

LAMINATED BALL JOINT CONNECTION DEVICE BETWEEN A ROTORCRAFT ROTOR BLADE AND A LEAD/LAG DAMPER OF SAID BLADE

CROSS REFERENCE TO RELATED APPLICATION

This application claims priority to French patent application No. FR 14 02816 filed on Dec. 11, 2014, the disclosure of which is incorporated in its entirety by reference herein.

BACKGROUND OF THE INVENTION (1) Field of the Invention

The present invention relates to the field of rotorcraft rotors, and it relates more particularly to ways of providing lead/lag damping for the blades of such rotors.

The present invention provides more specifically a rotorcraft rotor fitted with connection devices between lead/lag dampers and the blades of the rotary wing of said rotor. Such connection devices are more particularly of the type comprising a respective laminated ball joint that forms a stratified elastomer body incorporating blades of metal. Such a laminated ball joint is interposed in particular between a blade and a lead/lag damper associated therewith. This ball joint accommodates multidirectional relative movements between the members that are joined together by said ball joint.

(2) Description of Related Art

Rotorcraft are rotary wing aircraft in which at least lift is provided by at least one main rotor of substantially vertical axis. In the specific context of a helicopter, the main rotor provides the rotorcraft not only with lift, but also with propulsion in any travel direction. The attitude in flight of the helicopter can thus be modified by a human pilot or by an autopilot varying the pitch of the blades of the rotary wing of the main rotor cyclically and/or collectively.

Conventionally, the main rotor comprises a rotary hub driven in rotation by a power plant of the rotorcraft. Each blade has a root, referred to as the blade root, enabling it to be mounted individually on the hub in order to enable the blades to be driven jointly in rotation. In order to enable a pilot of the rotorcraft to cause the blades to perform said pitch variations, each blade is mounted on the hub with individual hinging at least about an individual axis for varying its pitch, referred to as the pitch variation axis, e.g. by means of a laminated abutment member having a spherical bearing surface.

The blades can thus be pivoted by the pilot of the rotorcraft about their respective pitch variation axes, collectively and/or cyclically, for the purpose of modifying the flight attitude of the rotorcraft.

Nevertheless, the individual behavior of blades moving on a hub is known to be complex. In addition to being movable in pivoting about their respective pitch variation axes, the blades are also commonly mounted to be individually movable relative to the hub in pivoting both about a flapping axis and about a lead/lag axis.

More particularly, each blade is generally mounted to be individually movable relative to the hub in vertical flapping about a flapping axis that extends orthogonally relative to the axis of rotation of the hub in a plane lying in the general plane of rotation of the hub. The term "vertical" should naturally be considered relative to the general direction in which the rotorcraft under consideration extends when on the ground. When the rotary wing is set into rotation, centrifugal force and lift forces typically cause the blades to move with vertical flapping motion, giving the rotary wing a shape that is slightly conical.

Still more particularly, the blades in general are also each hinged to the hub to perform individual lead/lag movement about a lead/lag axis extending substantially parallel to the axis of rotation of the hub, i.e. perpendicularly to the general plane in which the blade extends. Mounting the blades so that they are free to perform lead/lag movements and/or vertical flapping movements serves, when the rotor is set into rotation, to avoid the blades being subjected to bending moments in the general plane in which they extend.

Nevertheless, the individual oscillations of the blades about their lead/lag axes give rise to phenomena known as ground resonance and/or air resonance of the rotorcraft. Such resonance phenomena are known to be dangerous when the lead/lag movement of the blades about their lead/lag axes produces dynamic excitation in a stationary reference frame at a "regressive" frequency that is close to the resonant frequency of the aircraft on the ground or in flight.

In order to remedy this problem of resonance phenomena, it is known in particular to fit the blades of the main rotor with respective individual lead/lag damper devices suitable for damping the lead/lag oscillations of a given blade, referred to below as the blade "under consideration", with said blade under consideration having a given lead/lag damper associated therewith for damping its lead/lag oscillations.

In particular, each such lead/lag damper is placed between the hub and the corresponding blade under consideration, either directly in a configuration known as a "blade-hub" configuration or else indirectly in a configuration known as an "interblade" configuration that passes via a blade adjacent to said blade under consideration.

The lead/lag dampers commonly used can be arranged in a variety of ways, e.g. they may be of an elongate shape and work in traction and compression, or indeed they may be cylindrical in shape and work in twisting, for example.

In this context, a lead/lag damper conventionally comprises damper means provided at each of its ends with a respective endpiece, each of the endpieces being fitted with a laminated ball joint. More particularly, each endpiece is provided with a lug having an eye surrounding the elastomer body that is stratified and that incorporates metal plates.

A proximal endpiece is dedicated to connecting the lead/lag damper to the hub, and a distal endpiece is dedicated to connecting the lead/lag damper and to said blade under consideration. The laminated ball joints are connected by respective fittings to the hub for the proximal endpiece and to the blade under consideration for the distal endpiece. In general, said fitting is a simple fitting for the hub, and by way of example a fitting that is fastened to the blade root of each blade for fastening the blade to the hub, such as a blade root that is arranged as a cuff, for example.

By way of example, Document GB 2 041 310 Lovera (1979) describes a hinged rotor for a helicopter in which each blade of a rotor of this type is connected to its hub so as to have freedom of movement enabling it essentially to pivot about three fundamental axes. In that rotor, a damper comprising a bar that is movable longitudinally in a casing is arranged between each U-shaped yoke and the hub of the rotor. The bar is connected by a ball joint to the appendix of the lever, while the casing is connected by a second ball joint to the hub. The center of one of the ball joints is arranged on the longitudinal axis of the yoke, while the center of the other ball joint is placed on an axis perpendicular to the preceding axis and passing through the center of the spherical surfaces of the bearing.

Document FR 3 005 631 or EP 2 803 571 describes a resilient hinge connection for connecting a lead/lag damper to a rotor blade of a rotary wing aircraft. The connection includes a resilient ball joint for connecting to the damper, the resilient ball joint having a preferred direction of rotation, a lug is secured to the blade and a rod is assembled in the lug and to the resilient ball joint so that the axis of revolution of the rod extends along the privileged direction. That axis of revolution is for being positioned in a plane perpendicular to the axis of rotation of the hub and the rod is connected by a first connection embedded in the lug and by a second connection embedded in the resilient ball joint.

Document US 2004/037701 describes a helicopter rotor hub having a main body and connection elements projecting radially from the main body in order to co-operate with the main body to define respective closed profile housings. These housings receive respective blades. Each connection element is defined by a component separate from the main body and connectable to the body by releasable fastener means. Each element is C-shaped and forms two opposite arms that are connected together by a transverse portion, with their free ends being fastened to said body by the releasable fastener means.

For information about a technological environment close to the present invention, reference may be made for example to the following documents FR 2 653 405 or U.S. Pat. No. 5,141,398, and FR 2 733 961 or U.S. Pat. No. 5,636,970. Those documents disclose various structural organizations and various mounting configurations on a hub for lead/lag dampers of blades forming the rotary wing of a rotorcraft main rotor.

The use of a laminated ball joint provides a robust connection between the lead/lag damper and the blade under consideration, while still allowing omnidirectional relative movement between the lead/lag damper and said blade under consideration. Furthermore, such a laminated ball joint provides the advantage of simplifying the structural arrangements for providing the looked-for connection with freedom to move omnidirectionally between the lead/lag damper and said blade under consideration. Moreover, such a laminated ball joint is commonly used for connecting together two members with freedom for omnidirectional movement relative to each other.

On this topic, reference may be made by way of example to the following documents FR 2 839 945 or US 2004/001754, and EP 0 901 580 or U.S. Pat. No. 5,902,050, which disclose such ways of using an elastomer body for connecting together two members that are to be assembled together with freedom for omnidirectional relative movement between each other.

More specifically, concerning a hinge connection between a lead/lag damper and a rotor blade of a rotorcraft making use of a laminated ball joint, reference may be made for example to Document FR 2 630 703 or U.S. Pat. No. 4,915,585.

More particularly, tested techniques that are traditionally used for connecting a lead/lag damper to a said blade under consideration are known that make use of a laminated ball joint. For this purpose, use is made in particular of a connection device between the lead/lag damper and said blade under consideration, in which a laminated ball joint fitted to the distal endpiece of the lead/lag damper is provided with a tube of inside recess that provides a passage for receiving a rod for fastening the laminated ball joint to said blade under consideration.

Said rod is inserted through the tube and is fastened, in particular by bolting, to the blade root of said blade under consideration. Conventional fastening of the rod to the blade root by bolting provides a connection between them that is easily undone in order to enable an operator to connect the lead/lag damper easily to said blade under consideration, but care must be taken to ensure that the quality of tightening is sufficient and reliable.

In this context, it should be recalled that each blade of a rotorcraft main rotor is commonly movable individually not only with lead/lag movement about a lead/lag axis oriented substantially parallel to the axis of rotation of the hub, but also in vertical flapping in its own general plane about a respective flapping axis that is oriented perpendicularly to the axis of rotation of the hub and that lies in its general plane of rotation, while also being capable of varying its pitch, by the blades, pivoting individually in its own general plane about its respective pitch variation axis that is oriented substantially perpendicularly to the axis of rotation of the hub along the direction in which the blade extends in its own general plane, where "perpendicularly" ignores the flapping movements of the blades.

In known manner, the laminated ball joint has a preferred direction of deformation. The rod fastened to the blade root of said blade under consideration then extends relative to the hub so as to facilitate making use of deformation of the laminated ball joint in said preferred direction of deformation.

Naturally, it is desirable to place the laminated ball joint under stress in its preferred direction of deformation as a function of choices made concerning the various stresses to which laminated ball joint is subjected under the effect of said blade under consideration moving relative to the hub about its various movement axes with the hub, including the pitch variation axis, the flapping axis, and the lead/lag axis.

By way of indication, the preferred direction of deformation of the laminated ball joint allows said blade under consideration to move angularly by an amount that may involve angular variation of about 30° at most, whereas in directions perpendicular to said preferred direction of deformation of the laminated ball joint, angular movements of the blade under consideration are allowed at most over about 10°.

The lead/lag movements of the blade under consideration are small in amplitude and they are damped by the lead/lag damper provided for this purpose. However, the movements of the blade under consideration in terms of pitch variation and vertical flapping transmit a large amount of torque to the lead/lag damper, which torque is then taken up by the laminated ball joint.

In order to preserve the rod as well as possible from the twisting stresses to which it is subjected under the effect of flapping of said blade under consideration, it is conventional to orient the rod perpendicularly to the general plane in which the blade under consideration extends, i.e. essentially parallel to the lead/lag axis or indeed essentially parallel to the axis of rotation of the hub, ignoring pivoting variations of the blade respectively about its pitch variation axis and about its flapping axis. However, given that the rod is in such an orientation, the laminated ball joint is strongly stressed about axes perpendicular to the orientation of the rod, i.e. about high-stress axes that are oriented essentially parallel respectively to the flapping axis and to the pitch variation axis.

In this context, and also because of known facts for specifying the concept of the essential orientation of the rod, in particular relative to the axis of rotation of the hub, the movements of the blade under consideration about its various movement axes (pitch variation axis, flapping axis, and lead/lag axis) are known to vary depending on the azimuth orientation of said blade under consideration relative to the forward direction of the rotorcraft along its pitching and/or roll axis. Consequently, it is also known that there is a difference between the respective orientations of the rods providing connections between the various lead/lag dampers and the blades under consideration that are respectively associated therewith.

On the basis of the above-specified observed facts that have led to the approaches of the present invention, the present invention provides a rotorcraft rotor having lead/lag dampers for the blades making up the rotary wing of the rotorcraft.

In conventional manner, the lead/lag dampers are fastened to respective ones of said blades under consideration that are associated therewith by means of respective connection devices involving a respective laminated ball joints as defined above.

BRIEF SUMMARY OF THE INVENTION

The object of the present invention is to provide such a connection device that is organized so as to limit maintenance operations on the rotor that are known to be constraining and expensive, while also being of structure and size and weight that are as small as possible, as is essential in aviation.

It should be understood that said maintenance operations generally have the essential purpose of monitoring the quality of the connections provided between the blades and the lead/lag dampers respectively associated therewith, and also, where appropriate, of replacing wear parts of the devices providing said connections, and in particular the laminated ball joint and metal parts that are subjected to friction.

The connection devices between the blades and the lead/lag dampers that are respectively associated therewith are designed in particular to be robust, while also being of a structure that is as simple as possible in order to enable them to be obtained at small cost and enabling maintenance operations to be performed quickly by an operator.

The connection device is also desired to have a structure enabling the members making up the connection device to be preserved as well as possible from wear in order to increase their lifetime, in particular concerning the laminated ball joint and the members that are subjected to friction, as a result essentially of the repeated omnidirectional stresses to which the laminated ball joint is subjected.

It should also be taken into consideration that, in spite of the above-mentioned looked-for advantages of the connection device, the reliability and the robustness of the assembly provided by the connection device between the blades and the lead/lag dampers that are respectively associated therewith must not be damaged thereby, particularly in the context of lengthening the time between two maintenance operations. Consequently, the present invention also seeks to provide such a connection between a blade and a lead/lag damper that is reliable and robust while being as long-lasting as possible.

The rotorcraft rotor of the present invention is in particular a main rotor for providing the rotorcraft at least with lift. Such a rotor conventionally comprises a plurality of blades mounted on a hub that is rotatable about an axis of rotation of the rotor. Each blade is mounted to be individually movable on the hub in pivoting about various movement axes, typically including a pitch variation axis, a flapping axis, and a lead/lag axis, as defined above.

Each blade is provided with a lead/lag damper conventionally comprising damper means provided with endpieces, including a proximal endpiece engaged with the hub and a distal endpiece engaged with a given blade, referred to as the blade "under consideration", a given lead/lag damper being associated with said blade under consideration in order to damp its lead/lag movements. The distal endpiece is provided with a laminated ball joint including a through passage for receiving a rod for fastening the distal endpiece to a blade root of said blade under consideration.

In this context, it should be understood that the structural organization of the damper means is immaterial concerning the scope of the present invention, which seeks essentially to organize a connection device between a lead/lag damper and said blade under consideration with which the lead/lag damper is associated for the purpose of damping its lead/lag movements. More particularly, the damper means may potentially equally well be damper means of elongate shape working in traction and compression, or damper means of cylindrical shape working in twisting.

It should also be understood in this context that the ways in which the proximal endpiece and the hub are joined together is immaterial for the scope of the present invention. Such junctions may potentially be constituted equally well by blade-hub type junctions or interblade type junctions, as defined above.

In the present invention, an unusual choice is made to orient the rod in the general plane in which said blade under consideration extends, and more particularly in the general transversely-extending direction of said blade under consideration, i.e. essentially perpendicularly to the axis of rotation of the hub, ignoring variations as identified above in the orientation of said blade under consideration as a result of it moving about its flapping axis and/or its pitch variation axis.

Such an unusual choice is based on taking account of the ways in which the laminated ball joint deforms as a result of movements of the blade under consideration about its various movement axes, and in particular with respect to the preferred direction of deformation of the laminated ball joint.

In addition, such an unusual choice is based on a structurally simple organization of the junction between the rod and the blade root of the blade under consideration by means that provide the looked-for qualities of said junction and in particular by junction means that are robust and long-lasting and that limit phenomena of wear of the members used for connecting the distal endpiece of the lead/lag damper to the blade root of the blade under consideration in the context of the above-mentioned stresses.

In this context, and still in accordance with the present invention, the rod is more particularly secured to said blade under consideration firstly by the rod being embedded at a "first" one of its ends in the blade root of the blade under consideration. Such embedding prevents the rod moving in rotation relative to said blade under consideration, in particular under the effect of stresses to which the laminated ball joint is subjected.

Secondly, the rod is secured to said blade under consideration by its "second" other end being pinned to the cross-member of a U-shaped yoke. Each of the free ends of the branches of the yoke are provided with respective means for fastening to the blade root of said blade under consideration. The yoke thus provides a remote connection in the general transversely-extending direction of said blade under consideration between the second end of the rod and the blade root of the blade under consideration, preventing any movement in translation of the rod relative to said blade under consideration.

It can thus be seen that the rod is held firmly to the blade under consideration firstly in terms of rotation by being embedded in the blade root of the blade under consideration, and secondly in translation in the general transversely-extending direction of said blade under consideration by the rod being pinned to the yoke, which is itself fastened to the blade root of the blade under consideration via its branches.

As a result of these provision, the connection between the distal endpiece of the lead/lag damper and the blade under consideration is obtained while using a limited number of parts. In addition, with the laminated ball joint being mounted in this way on said blade under consideration, deformation of the laminated ball joint in its preferred direction of deformation avoids the rod being subjected to twisting stresses under the effect of stresses induced by the movements of said blade under consideration in flapping and in pitch variation, in particular.

Such a result lies in the context, as proposed by the present invention, firstly of the rod being held firmly by being embedded in said blade under consideration so as to be oriented in the general transversely-extending direction of said blade under consideration, and secondly by preventing any movement in translation of the rod relative to the blade under consideration, as a result of it being embedded in the blade root of the blade under consideration and as a result of it being pinned to the yoke, which is itself fastened to the blade root of the blade under consideration.

The rod is thus protected from any twisting stress as a result of said blade under consideration moving about its flapping axis and/or its pitch variation axis, as a result of the rod accompanying movements of said blade under consideration about its flapping axis and/or about its pitch variation axis and as a result of the forces induced being taken up by the laminated ball joint along its preferred direction of deformation.

In addition, maintenance operations on the connection device between the blade under consideration and the distal endpiece of the lead/lag damper are reduced, since friction is avoided between the parts making up said connection device, so operations of monitoring the junction between the connection device and said blade under consideration are also avoided, unlike conventional techniques, in particular those in which the rod is formed by a bolt extending perpendicularly to the general plane in which said blade under consideration extends, with it being necessary to inspect the tightening of the bolt regularly because of the deformations to which the laminated ball joint is subjected.

Consequently, it is possible to envisage various techniques for embedding the rod in said blade under consideration, given the particular context of the present invention and the approaches used for solving the problems posed, and also the mechanical phenomena specific to this context.

In a simple embodiment, the rod is secured at its first end to a key for embedding the rod in a housing of the blade root of the blade under consideration, said housing being of a shape complementary to the shape of the key.

Such a key is preferably fabricated integrally with the rod. For example, the key is in the shape of a polygon provided at one end of the rod in the general direction in which it extends. Also, for example, the key is formed by at least one arm extending transversely relative to the general direction in which the rod extends. Such a solution is preferred insofar as such an arm provides a considerable lever arm for retaining the rod against being driven in rotation about its own axis.

In addition, another advantage of this solution is that it makes it possible to balance considerable forces for retaining the rod against being driven in rotation about its own axis by said blade under consideration, in spite of the individual lever arm effect produced by any given arm. The key may have at least two arms arranged transversely on either side of the rod in the general direction in which it extends.

In order to optimize robust and balanced retention of the rod against rotating about its own axis, the key is advantageously in the form of a cross having at least three said arms that are radially distributed at 120° about the general direction in which the rod extends, or indeed preferably having four arms that are radially distributed at 90° about the general direction in which the rod extends.

Said fastener means at the free ends of the branches of the yoke are in particular arranged as pegs, each passing through a corresponding branch respectively associated therewith and the blade root of the blade under consideration, in a direction that extends perpendicularly to the general plane in which the blade under consideration extends.

With reference to a given branch of the yoke, said fastener means are preferably arranged as at least two pegs that are spaced apart from each other at least in the general transversely-extending direction of said blade under consideration, and possibly also, and preferably, in the general longitudinally-extending direction of said blade under consideration.

Such pegs may be arranged as screw-fastener members, each preferably being provided with first retaining means for retaining it against turning as a result of the yoke being fastened to the blade root of the blade under consideration.

Such first retaining means can easily be obtained at low cost, e.g. by being formed as a removable eccentric engaging jointly with the peg and with the blade root of the blade under consideration, and in particular extending through a head of said peg and through a cylinder in the blade root of the blade under consideration. Other known techniques for retaining a member against turning about its own axis may naturally be used, e.g. using a staple.

In a variant, the pegs may be arranged as pins that are a tight fit in the blade root of the blade under consideration and the branch associated therewith.

Furthermore, the second end of the rod is secured to the yoke by means of at least one pin passing as a tight fit through the second end of the rod and through the cross-member of the yoke. Said pin is advantageously oriented in a direction parallel to the general longitudinally-extending direction of said blade under consideration so as to avoid it being put under stress as a result of pitch variation and/or flapping movements of said blade under consideration, the function of the pin being limited to preventing the rod from moving in translation relative to said blade under consideration along its general transversely-extending direction.

In an embodiment, said pin may be arranged as a screw-fastener member connecting together the cross-member and the second end of the rod by clamping. In this context, the pin is preferably provided with second retaining means against it being caused to rotate as a result of the cross-member being secured to the second end of the rod. Such second retaining means may be arranged in similar manner to the first retaining means as described above.

In a variant, said pin is arranged as a tight-fit member between the cross-member and the second end of the rod.

It should be observed that the respective arrangements of said pegs and said pin may be selected from screw-fastener techniques or tight-fit techniques, with this choice being made depending on preferred conditions of rapid and easy assembly and disassembly for an operator acting on the connection device, either by using moderate force to extract the peg and/or the pin and/or the rod, or by turning the pegs and/or the pin in order to tighten them or to loosen them.

It should be observed that if said pin and/or pegs are arranged as screw-fastener members, the organization of the invention for the connection device between the lead/lag damper and the blade under consideration provides said pin and/or said pegs with respective orientations that tend to avoid them potentially working loose in operation under the effect of forces to which the connection device is subjected, in particular by the rod being oriented in the general plane in which the blade extends and more particularly along its general transversely-extending dimension.

The distal endpiece is potentially reversibly mounted on the lead/lag damper. The distal endpiece may be secured to the lead/lag damper, in particular to a pull rod of the lead/lag damper, equally well by screw fastening, by sealing, by pins, and/or by a tight fit, for example, depending on the preferred conditions for rapid and easy assembly and disassembly by an operator acting on the connection device between the lead/lag damper and the blade under consideration.

Among the various advantages provided by the connection device according to the invention, particular mention may be made of the following:

a limited number of parts making up the connection device;

a limited number of parts of the connection device that are subjected to wear, and in particular that are subjected to friction;

compact size and low weight of the connection device;

a reduction in fabrication and maintenance costs of the connection device, in particular by fabrication of the rod incorporating fabrication of the key and of a through orifice in the rod for the pin connecting it to the yoke;

using a plurality of pegs for fastening each of the branches of the yoke to said blade under consideration, the pegs being arranged perpendicularly to the general plane of the blade and accompanying its movements about its various movement axes, the pegs being spaced apart from one another in one and/or the other of the general directions in which said blade under consideration extends. Such provisions can in themselves provide said first retaining means against spontaneous unscrewing of the pegs when the pegs are arranged as screw-fastener members, or they can at least contribute to forming said first retaining means.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

Figure 1:
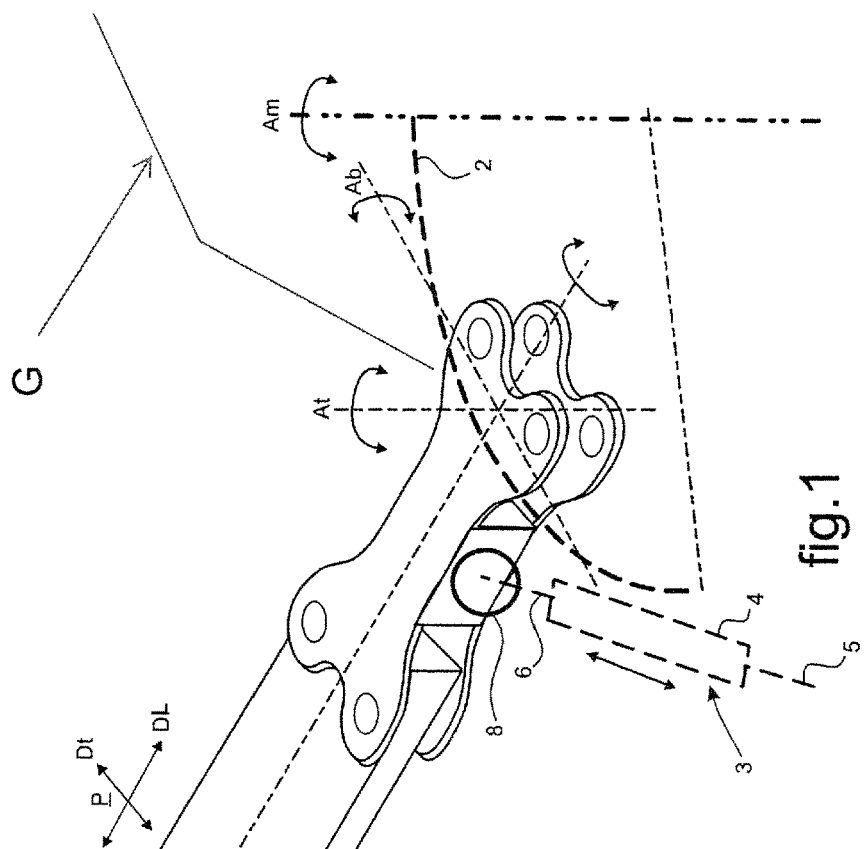
FIG. 1 is a diagrammatic perspective view of a rotorcraft rotor blade showing the various movement axes of the blade relative to a hub on which the blades making up the rotary wing of said rotor are mounted in order to be driven in rotation.

In FIG. 1, a blade 1 of a rotorcraft rotor G is mounted on a hub 2 of the rotor, typically being movable in pivoting relative to the hub 2 about a plurality of movement axes, including a pitch variation axis Ap, a flapping axis Ab, and a lead/lag axis At.

The pitch variation axis Ap extends in the general longitudinally-extending direction of said blade 1. The flapping axis Ab extends in the general transversely-extending direction of said blade 1, transversely to the axis of rotation Am of the hub 2 in its general plane of rotation. The lead/lag axis At extends perpendicularly to the general plane of the blade 1 or indeed essentially parallel to the axis of rotation Am of the hub 2, making allowance for pivoting variations of the blade 1 about its various movement axes, and in particular about its flapping axis Ab and about its pitch variation axis Ap.

In this context, the blade 1 is fitted with a lead/lag damper 3 essentially constituted by damper means 4 provided at each of its ends with a respective endpiece 5, 6.

A proximal endpiece 5 serves to connect the damper means 4 to the hub 2 directly, or indirectly via a blade neighboring the blade shown, referred to as the blade 1 under consideration, which blade 1 under consideration is associated with the lead/lag damper 3 in order to damp lead/lag oscillations of said blade 1 under consideration about its lead/lag axis At. A distal endpiece 6 is used for connecting the damper means 4 to a blade root 7 of said blade 1 under consideration, via a connection device 8 essentially constituting the subject matter of the present invention in the context of a rotorcraft rotor.

Although the lead/lag damper 3 shown diagrammatically in FIG. 1 includes damper means 4 of elongate shape working in traction and compression, it should be understood that the present invention is applicable to a rotorcraft rotor regardless of the arrangement of said damper means 4 provided with a distal endpiece 6 for connecting it to the blade 1 under consideration.

Figure 2:
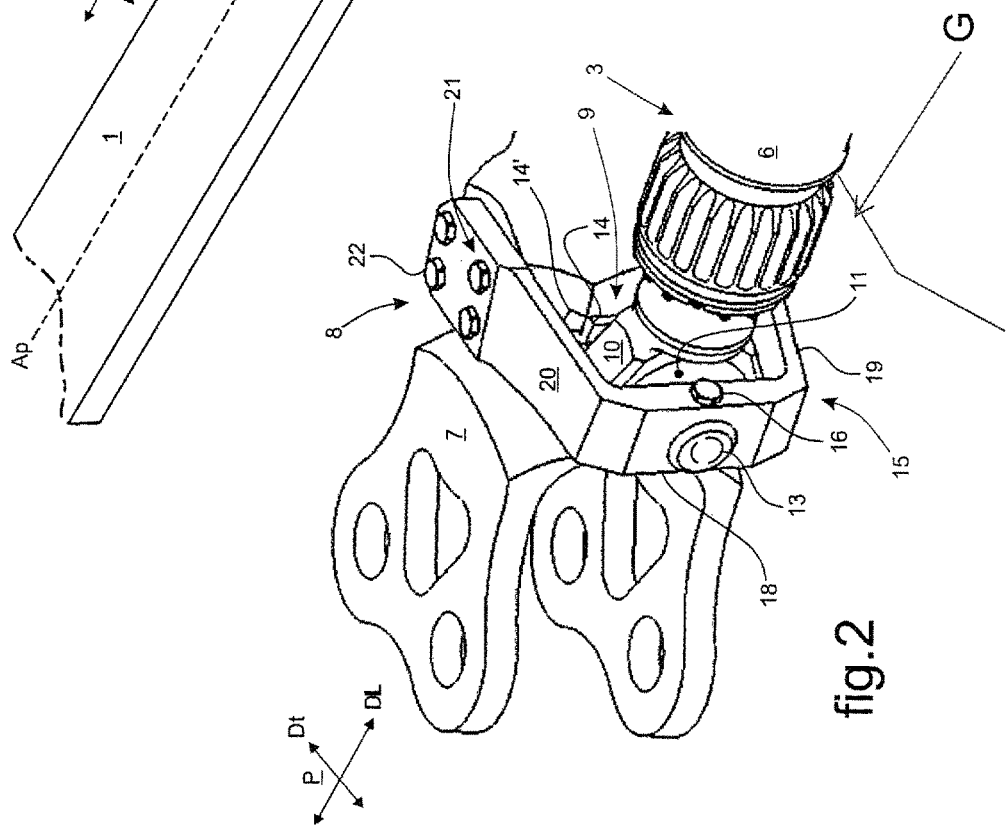
FIGS. 2 and 3 are respectively a perspective view and a cross-section view with a small amount of rear perspective showing an embodiment of a connection device in accordance with the present invention, said cross-section being on a plane extending transversely relative to the blade 1 under consideration of a rotorcraft rotor.
Figure 3:
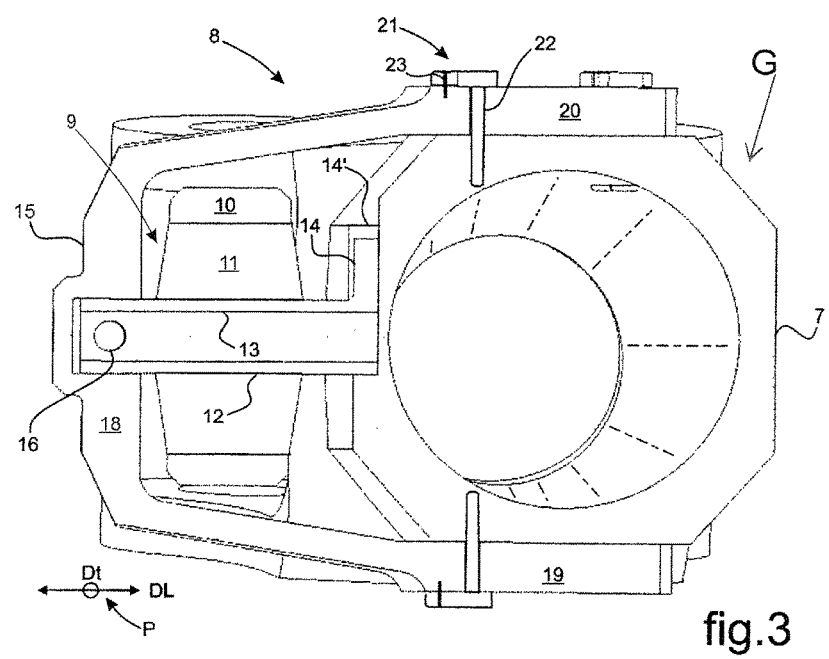

FIGS. 2 and 3 show the blade root 7 of a blade 1 under consideration of a rotorcraft G that is fastened to the distal endpiece 6 of a lead/lag damper associated with said blade 1 under consideration, by means of a said connection device 8 as mentioned with reference to FIG. 1.

The connection device 8 is of the type comprising a laminated ball joint 9 placed between the blade root 7 and the remote endpiece 6 (visible in FIG. 2) of the lead/lag damper 3 (visible in FIG. 2). With reference also to the various diagrams of FIG. 4, such a laminated ball joint 9 comprises an elastomer body 11 that is stratified by incorporating metal plates, said elastomer body 11 being clamped within an eyelet 10 forming part of the distal endpiece 6 of the lead/lag damper.

The laminated ball joint 9 has a passage 12 (visible in FIG. 3) for receiving a rod 13 arranged in the general plane P in which the blade 1 under consideration extends. The rod 13, when considered in its general extension direction, is more particularly oriented in the general transversely-extending direction (Dt) of said blade 1 under consideration. The rod 13 is incorporated in the laminated ball joint, emerging from the elastomer body 11 at each of its ends in order to enable the distal endpiece 6 of the lead/lag damper to be fastened to the blade root 7.

In FIGS. 2 and 3, a first end of the rod 13 is secured to the blade root 7 by being embedded therein. For this purpose, the first end of the rod 13 includes a key 14 co-operating with a housing 24 in the blade root 7 that receives the key 14 embedded therein. These provisions are such that relative movement in rotation of the rod 13 relative to the blade root 7 is completely prevented.

A second end of the rod 13 is secured to a U-shaped yoke 15, advantageously by being pinned by means of a pin 16 in the embodiment shown, so as to prevent any movement in relative translation between the rod 13 and the blade root 7. The yoke 15 is a junction part between the second end of the rod 13 and the blade root 7, the arrangement of such a junction part as a U-shaped yoke providing a remote connection in the general transversely-extending direction Dt of said blade 1 under consideration, between the second end of the rod 13 and the blade root 7.

Other analogous arrangements in the form of an arch in such a junction part are possible, the arch arrangement of the yoke 15 or of any other part of analogous shape leaving a space for receiving the laminated ball joint 9 and providing said remote junction between the second end of the rod 13 and the blade root 7 of the blade 1 under consideration.

The yoke 15 comprises a cross-member 18 interconnecting two branches 19 and 20. The yoke 15 is provided at the free ends of each of the branches 19 and 20 of the yoke 15 with fastener means 21 for fastening to the blade root 7, the fastener means being arranged on either side of the blade root 7 about the plane P in which the blade 1 under consideration generally extends.

Said fastener means 21 are constituted by pegs 22 passing through the blade root 7 and through the branch 19 or 20 with which the pegs 22 is associated. Such pegs 22 may be constituted by bolts or by pins. For each of the branches 19 and 20 of the yoke 15, the pegs 22 are spaced apart at a distance from each other at least in the general transversely-extending direction Dt of said blade 1 under consideration, and possibly also, as shown and preferably, in the general longitudinally-extending l-direction DL of said blade 1 under consideration.

Each peg 22 is preferably provided with first retaining means 23 for retaining it against being removed spontaneously from the blade root 7 and/or a branch 19, 20 of the yoke 15. By way of example, such first retaining means 23 fitted to each of the pegs 22 may be arranged as shown as an eccentric secured to a given peg 22. Such eccentrics are suitable for preventing any turning movement of the pegs 22 if the pegs 22 are arranged as bolts.

Furthermore, the second end of the rod 13 is secured to the cross-member 18 of the yoke 15 by means of the pin 16 passing both through the cross-member 18 and the rod 13. Under such conditions, the pin 16 has the general direction in which it extends substantially parallel to the general longitudinally-extending direction Dt of said blade 1 under consideration. The pin 16 is potentially arranged as a tight-fit member or as a screw-fastener member connecting together the cross-member 18 and the second end of the rod 13 placed at a distance from the blade root 7 in the general transversely-extending direction Dt of said blade 1 under consideration.

Figure 4A:
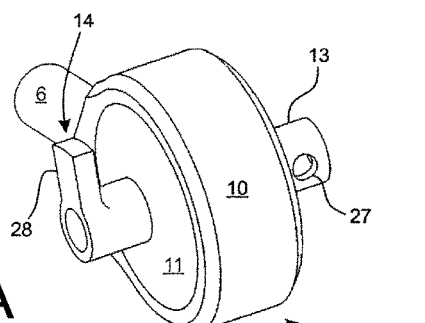
FIG. 4 is made up of three diagrams (a), (b), and (c), showing the respective embodiments of a laminated ball joint forming part of a connection device in accordance with the present invention.
Figure 4B:
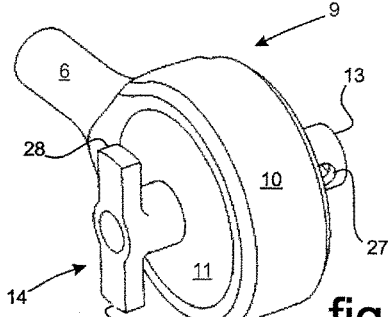
Figure 4C:
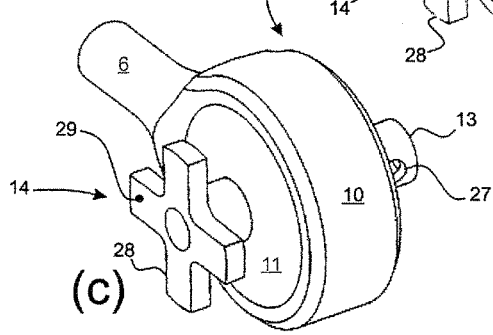

Embodiments of said laminated ball joint 9 are shown respectively in the diagrams (a), (b), and (c), making up FIG. 4.

With reference to the above description of the figures, the rod 13 is arranged to connect together the blade root 7 of said blade 1 under consideration and the distal endpiece 6 of the lead/lag damper 3 serving to provide lead/lag damping of said blade 1 under consideration. The rod 13 includes a hole 27 at its second end for receiving therethrough the pin 16, and at its first end it includes a key 14 for embedding the first end of the rod 13 in said blade root 7.

Various possible shapes for the key 14 on the rod 13 are shown respectively in the diagrams (a), (b), and (c). In a preferred general arrangement of the key 14 that is common to all of the diagrams (a), (b), and (c), the key 14 has at least one arm 28 extending transversely relative to the general direction in which the rod 13 extends.

In diagram (a), the key 14 is arranged as a single arm 28. In diagram (b), the key 14 is arranged as two arms 28 that are radially opposite about the general direction in which the rod 13 extends. In diagram (c), the key 14 is arranged as a cross 29 having four arms 28 radially distributed at 90° intervals about the general direction in which the rod 13 extends.

What is claimed is:

1. A rotorcraft rotor comprising:
    a plurality of blades mounted on a hub rotatable about an axis of rotation of the rotor, each blade individually mounted on the hub to pivot about at least one of a pitch variation axis, a flapping axis, and a lead/lag axis, wherein at least one of the plurality of blades is a blade under consideration;
    at least one lead/lag damper including a proximal endpiece engaged with the hub and a distal endpiece engaged with the blade under consideration, the distal endpiece provided with a laminated ball joint including a through passage; and
    a rod received in the through passage for fastening the distal endpiece to a blade root of the blade under consideration, wherein the lead/lag damper associated with the blade under consideration damps lead/lag movements, and
    wherein
    the rod generally extends in a longitudinal direction in which the blade under consideration extends,
    wherein a first end of the rod is embedded in the blade root of the blade under consideration to prevent movement in rotation of the rod relative to the blade under consideration, and
    the rod is secured at a second end to a U-shaped yoke formed of a cross-member and a pair of branches, a free end of each of the branches of the yoke provided with a fastener to secure the blade root of the blade under consideration.

2. The rotorcraft rotor according to claim 1, wherein the rod is secured at the first end to a key for embedding the rod in a housing of the blade root of the blade under consideration, the housing being of a shape complementary to a shape of the key.

3. The rotorcraft rotor according to claim 2, wherein the key is fabricated integrally with the rod.

4. The rotorcraft rotor according to claim 2, wherein the shape of the key comprises a polygon provided at one end of the rod.

5. The rotorcraft rotor according to claim 2, wherein the key is formed by at least one arm extending transversely relative to the longitudinal direction.

6. The rotorcraft rotor according to claim 5, wherein the key is shaped as a cross.

7. The rotorcraft rotor according to claim 1, wherein the fastener at the free ends of the branches of the yoke comprises a peg, wherein the peg passes through a corresponding branch respectively associated therewith and the blade root of the blade under consideration, in a direction that extends generally perpendicularly to the plane in which the blade under consideration extends.

8. The rotorcraft rotor according to claim 7, wherein the fastener comprises at least two pegs that are spaced apart from each other at least in and extend at least one of a longitudinal direction and transverse from the longitudinal direction of the blade under consideration.

9. The rotorcraft rotor according to claim 7, wherein the pegs are arranged as screw-fastener members.

10. The rotorcraft rotor according to claim 9, wherein each peg is provided with first retaining means for retaining it against turning as a result of the yoke being fastened to the blade root of the blade under consideration.

11. The rotorcraft rotor according to claim 1, wherein the second end of the rod is secured to the yoke by at least one pin extending in a direction that is parallel to the longitudinal direction of the blade under consideration.

12. A rotorcraft rotor comprising:
a plurality of blades mounted to rotate about a rotor axis, each blade mounted to individually pivot about at least one of a pitch variation axis, a flapping axis, and a lead/lag axis;
at least one lead/lag damper positioned between a first blade of the plurality of blades and a rotor hub, the lead/lag damper comprising:
a laminated ball joint with a through passage;
a U-shaped yoke formed of a cross-member and a pair of branches, wherein a free end of each of the branches is fastened to the first blade;
a rod extending in the through passage in a longitudinal direction of the first blade, wherein a first end of the rod is embedded in the first blade to prevent the rod from rotating relative to the first blade, and wherein a second end of the rod is pinned to the cross-member of the U-shaped yoke.

13. The rotorcraft rotor according to claim 12, wherein the first end of the rod has a key shape and the first blade has a key opening corresponding to the key shape of the rod such that when the key shape is embedded in key opening, the rod is prevented from rotating relative to the first blade.

14. The rotorcraft rotor according to claim 13, wherein the first end of the rod has a transverse arm extending transverse relative to the longitudinal direction.

15. The rotorcraft rotor according to claim 13, wherein the key shape of the key comprises a polygon.

16. The rotorcraft rotor according to claim 13, wherein the first end of the rod has a transverse arm extending transverse relative to the longitudinal direction, wherein the transverse arm defines the key shape of the rod.

17. The rotorcraft rotor according to claim 16, comprising a plurality of transverse arms, wherein the key shape is defined as a cross.

18. The rotorcraft rotor according to claim 12, wherein the free ends of the branches of the yoke are fastened to the first blade with a peg that extends generally perpendicularly to the plane in which the first blade extends.

19. The rotorcraft rotor according to claim 12, wherein the second end of the rod is secured to the yoke by at least one pin extending in a direction parallel to the longitudinal direction of the first blade.

20. A lead/lag damper for a rotorcraft connecting a blade and a rotor hub, the lead/lag damper comprising:
a laminated ball joint with a through passage;
a U-shaped yoke formed of a cross-member and a pair of branches, wherein a free end of each of the branches is adapted to be fastened to the blade of the rotorcraft;
a rod extending in the through passage of the laminated ball joint in a longitudinal direction of the blade, wherein a first end of the rod is adapted to be embedded in the blade to prevent the rod from rotating relative to the blade, and wherein a second end of the rod is pinned to the cross-member of the U-shaped yoke.

\* \* \* \* \*